United States Patent [19]

Stringfield

[11] Patent Number: 5,460,725
[45] Date of Patent: Oct. 24, 1995

[54] POLYMERIC ADSORBENTS WITH ENHANCED ADSORPTION CAPACITY AND KINETICS AND A PROCESS FOR THEIR MANUFACTURE

[75] Inventor: Richard T. Stringfield, Midland, Mich.

[73] Assignee: The Dow Chemical Company, Midland, Mich.

[21] Appl. No.: 398,485

[22] Filed: Mar. 3, 1995

Related U.S. Application Data

[62] Division of Ser. No. 262,820, Jun. 21, 1994, Pat. No. 5,416,124.

[51] Int. Cl.$^6$ .................................................. B01D 15/04
[52] U.S. Cl. ........................ 210/690; 210/691; 210/692; 521/56; 521/146; 521/31; 521/38
[58] Field of Search ................................ 210/690, 691, 210/692; 521/56, 146, 31, 38

[56] References Cited

U.S. PATENT DOCUMENTS

| | | | |
|---|---|---|---|
| 4,224,415 | 9/1980 | Meitzner et al. | 521/38 |
| 4,263,407 | 4/1981 | Reed, Jr. | 521/31 |
| 4,543,365 | 9/1985 | Itagaki et al. | 521/53 |
| 4,950,332 | 8/1990 | Stringfield et al. | 216/663 |
| 5,218,004 | 6/1993 | Meteyer | 521/62 |
| 5,331,015 | 7/1994 | DesMarais et al. | 428/319.3 |

OTHER PUBLICATIONS

*Reactive Polymers*, by V. A. Davankov et al., "Structure and Properties of Hypercrosslinked Polystyrene—the first Representative of a New Class of Polymer Networks" (1990) pp. 13, 27.

Primary Examiner—Morton Foelak

[57] ABSTRACT

Polymeric adsorbent resins having both the high capacity associated with microporosity and the favorable kinetics associated with mesoporosity and macroporosity are useful for the chromatographic separation of organic compounds. These resins are prepared by alkylene bridging haloalkylated, porogen modified, cross-linked copolymers.

6 Claims, No Drawings

POLYMERIC ADSORBENTS WITH ENHANCED ADSORPTION CAPACITY AND KINETICS AND A PROCESS FOR THEIR MANUFACTURE

CROSS REFERENCE TO RELATED APPLICATION

This is a divisional of application Ser. No. 08/262,820, filed Jun. 21, 1994, now U.S. Pat. No. 5,416,124.

FIELD OF THE INVENTION

The present invention concerns novel polymeric adsorbent resin beads, the process for their manufacture and their use in the separation of organic compounds. The novel adsorbent resins are prepared by alkylene bridging haloalkylated, porogen-modified, cross-linked copolymer beads and have microporosities of from about 0.2 to about 0.5 cubic centimeters per gram (cc/g), mesoporosities of at least 0.5 cc/g and a total porosity of at least 1.5 cc/g. The adsorbent resins are particularly useful for chromatographic separations of organic adsorbates having molecular weights between about 200 and about 1000.

BACKGROUND OF THE INVENTION

The rapid increase in biotechnology along with the consumer's desire for tastier, healthier and more aesthetically pleasing foodstuffs and beverages has contributed to a need for highly selective, efficient and cost-effective processes for separating various chemicals from complex mixtures. While highly selective chromatographic adsorbent and membrane separation processes have gained wide acceptance among industrial users, the demand for better separation materials is rapidly moving beyond the realm of conventional adsorbents.

With respect to adsorbent resins, basically two types of styrenic adsorbents are commercially available, i.e., porogen modified styrene/divinylbenzene adsorbents and methylene-bridged styrene/divinylbenzene adsorbents.

In the diluent or porogen-modified styrene/divinylbenzene adsorbents, the amount of divinylbenzene ranges from 35 to 80 weight percent in order to impart pore stabilization and rigidity to the polymer structure and to prevent pore collapse. The porogens, such as toluene and/or iso-octane, are chosen to control the pore size distributions. The closer the solubility parameter of the porogen to the solubility parameter of the polymer, the more is mesoporosity, i.e., pores with diameters of from 2 to 20 nanometers (nm), preferred. Similarly, macroporosity (>20 nm) is favored when the solubility parameters are very different and/or the porogen volumes are high. In either case, the amount of microporosity (<2 nm) is usually small, ranging up to about 0.15 cc/g. Consequently, the surface area for such adsorbents typically range from about 400 to about 900 square meters per gram (m$^2$/g) depending upon the amount of crosslinker.

Furthermore, according to these methods, the pores in the polymer are formed during the polymerization. Therefore, if an attempt is made to substantially develop the pores, the resin strength tends to decrease substantially. Accordingly, the proportion of pores is necessarily limited. Thus, it has been difficult to produce a product having a high porosity.

In order to increase porosity and surface area, such highly crosslinked copolymer resins have been treated with Lewis-acid catalysts in the presence of a non-swelling liquid (U.S. Pat. No. 5,218,004) and in the presence of a swelling solvent (U.S. Pat. No. 4,543,365). However, in neither case is the highly crosslinked copolymer resin haloalkylated and bridged; rather, the porous structure is believed to be modified either by the reaction of pendant vinyl groups or by the reorganization of existing crosslinkages by breakage and reformation.

The methylene-bridged, styrene/divinylbenzene adsorbents, on the other hand, are produced from lightly crosslinked gel or macroporous copolymers that possess good swelling characteristics (U.S. Pat. No. 4,263,407 and U.S. Pat. No. 4,950,332). Thus, the amount of crosslinking agent in such polymers is typically less than 8 percent. The gel phase of the copolymers undergoes considerable expansion during the bridging process, producing large amounts of microporosity ranging up to about 0.7 cc/g. The methylene bridging serves to lock the polymer structure in place while swollen and to prevent pore collapse. If macroporous copolymers are used, the adsorbents can exhibit considerable macroporosity as well; total surface area can range up to about 1600 m$^2$/g. Unfortunately, mesoporosity remains on the low side, i.e., less than 0.5 cc/g.

In chromatographic separations, it is well established that high surface area, i.e., a high level of microporosity, increases the adsorption capacity of adsorbents for small molecules, while a high level of macroporosity and mesoporosity improves adsorption kinetics. Thus, porogen-modified, styrene/divinylbenzene adsorbents, typically characterized as having mesoporosity greater than 0.5 cc/g and microporosity less than 0.15 cc/g, generally exhibit excellent exchange kinetics but poor adsorption capacity. Conversely, methylene-bridged, styrene/divinylbenzene adsorbents, typically characterized as having mesoporosity less than 0.5 cc/g and microporosity greater than 0.2 cc/g, tend to have sufficient adsorption capacity but slow exchange kinetics. It would be desirable to combine the advantages of high capacity and rapid kinetics in a single adsorbent.

SUMMARY OF THE INVENTION

It has now been found that adsorbent resins having more favorable capacity and exchange-rate profiles while maintaining physical strength can be prepared by alkylene bridging haloalkylated, porogen-modifed, crosslinked copolymer beads. The present invention uncouples the dependence of the adsorbent's pore structure on the amount of polyvinyl aromatic crosslinking monomer in the copolymer to control both copolymer swelling and pore stabilization, two properties which are diametrically opposed. In the present invention the adsorbent pore structure is predetermined by the porogen composition used in the synthesis of the copolymer. While sufficiently high levels of polyvinyl aromatic crosslinking monomer are needed to cause the specific pore structure in the copolymers, excessively high levels are not needed for pore stabilization. Pore stabilization is accomplished by the subsequent alkylene bridging. Thus, the present invention concerns a polymeric adsorbent resin having microporosity of from about 0.2 to about 0.4 cc/g, mesoporosity of at least 0.5 cc/g and a total porosity of at least 1.5 cc/g, and in which the microporosity comprises less than 20 percent of the total porosity comprising a porogen-modified crosslinked copolymer of from 45 to 80 weight percent of at least one monovinyl aromatic monomer, from 0 to 20 weight percent of a monovinyl aliphatic monomer and from 20 to 35 weight percent of a polyvinyl aromatic crosslinking monomer, the copolymer being further crosslinked by alkylene bridging.

In addition to the polymeric adsorbent itself, the present invention also concerns a process for the preparation of polymeric adsorbent resin beads having microporosity of from about 0.2 to about 0.4 cc/g, mesoporosity of at least 0.5 cc/g and a total porosity of at least 1.5 cc/g, and in which the microporsity comprises less than 20 percent of the total porosity which comprises:

(a) polymerizing in a continuous aqueous phase a suspension of organic monomers comprised of from 45 to 80 weight percent based on total monomer weight of at least one monovinyl aromatic monomer, from 0 to 20 weight percent based on total monomer weight of a monovinyl aliphatic monomer, from 20 to 35 weight percent based on total monomer weight of a polyvinyl aromatic crosslinking monomer, from 50 to 70 weight percent based on the total weight of monomers and solvent of a porogenic solvent and a catalytic amount of a free-radical initiator, wherein the ratio of the monovinyl aromatic and aliphatic monomers to the polyvinyl aromatic crosslinking monomer is from 1.8 to 4.0, to prepare crosslinked copolymer beads;

(b) haloalkylating the copolymer beads; and (c) post-crosslinking the haloalkylated copolymer beads in a swollen state in the presence of a Friedel-Crafts catalyst.

Yet another aspect of the present invention is an improved method for the separation of organic adsorbates having molecular weights in the range of from about 200 to about 1000, wherein the improvement is comprised of contacting a mixture of adsorbates with a polymeric adsorbent having microporosity of from about 0.2 to about 0.4 cc/g, mesoporosity of at least 0.5 cc/g and a total porosity of at least 1.5 cc/g, and in which the microporosity comprises less than 20 percent of the total porosity comprised of a porogen-modified crosslinked copolymer of from 45 to 80 weight percent of at least one monovinyl aromatic monomer, from 0 to 20 weight percent of a monovinyl aliphatic monomer and from 20 to 35 weight percent of a polyvinyl aromatic crosslinking monomer, the copolymer being further crosslinked by alkylene bridging.

DETAILED DESCRIPTION OF THE INVENTION

The terminology used to describe various adsorbent properties is not always consistent. With respect to the characterization of pores, a definitive line of demarcation between the sizes of the various pore types does not really exist. The molecular and capillary sized pores in copolymers and adsorbents are irregularly shaped as are the probe molecules that are used in the measurements for determining their pore structures. Most classical techniques used to measure the geometric properties of copolymers and adsorbents assume the pores to be either cylindrical or slit shaped and the pore structure is defined by the corresponding geometric relationships. Consequently, the pore structure depends a great deal on the model used to interpret the characteristic adsorption/desorption isotherm.

As used herein, the various pore types have the following definitions. Micropores are defined as pores of less than 2 nm diameter. These pores are created by the spaces between the crosslinked polymer chains within the gel regions of the copolymer. Mesopores are defined as pores ranging from 2 to 20 nm diameter. These pores are created by the void spaces or cracks between gel regions of copolymer or precipitated microsphere agglomerates. Macropores are defined as pores of greater than 20 nm diameter. These pores are created by solvent aided precipitation of copolymer microsphere agglomerates during polymerization or by phase separation of the polymer and a porogenic agent.

The terms microporosity, mesoporosity and macroporosity refer to the pore volume per gram of sample for each type of pore respectively and are reported in units of cc/g. These porosities, as well as surface area and average pore size, are determined by the nitrogen adsorption method in which dried and degassed samples are analyzed on an automatic volumetric sorption analyzer. The instrument works on the principle of measuring the volume of gaseous nitrogen adsorbed by a sample at a given nitrogen partial pressure. The volumes of gas adsorbed at various pressures are used in the B.E.T. model for the calculation of the surface area of the sample. The average pore radius is calculated from the relationship between the surface area and the pore volume of the sample, assuming a cylindrical pore geometry.

The polymeric adsorbent resins of the present invention are distinguished from earlier adsorbents in so far as they contain an advantageous proportion of both microporosity and mesoporosity so as to impart either improved capacity or improved kinetics over conventional adsorbent resins. The microporosity of these adsorbents ranges from about 0.2 to about 0.4 cc/g. At the same time, the mesoporosity exceeds 0.5 cc/g, the preferred range being between from 0.5 to 1.3 cc/g. In order to attain a proper balance between capacity and exchange rate, the microporosity shall comprise no more than 20 percent of the total porosity.

The polymeric adsorbent resins of the present invention are comprised of porogen-modified crosslinked copolymer of at least one monovinyl aromatic monomer and a polyvinyl aromatic crosslinking monomer. These crosslinked copolymers are further crosslinked by subsequent alkylene bridging. The most important parameters allowing the interdependent production of micropores (<2 nm), mesopores (2 to 20 nm) and macropores (>20 nm) in the same adsorbent are the amount of polyvinyl aromatic crosslinking monomer, the volume of the porogen and the composition of the porogen.

Monovinyl aromatic monomers include styrene, vinyltoluenes, ethylvinylbenzenes and vinylnaphthalenes and may also include heterocyclic monomers such as vinylpyridine. The preferred monovinyl aromatic monomers include styrene, vinyltoluene, ethylvinylbenzene and mixtures thereof. Styrene, ethylvinylbenzene and their mixtures are most preferred. The monovinyl aromatic monomers comprise of from 45 to 80 weight percent of the total monomer mixture, preferably of from 65 to 80 weight percent of the total monomer mixture.

Monovinyl aliphatic monomers include derivatives of acrylic and methacrylic acids and acrylonitrile. The preferred monovinyl aliphatic monomers include methyl methacrylate, acrylonitrile, ethyl acrylate, 2-hyroxyethyl methacrylate and mixtures thereof. The monovinyl aliphatic monomers comprise of from 0 to 20 weight percent of the total monomer mixture. Since subsequent alkylene bridging occurs between aromatic rings, it is often preferable not to employ any monovinyl aliphatic monomer or to keeps its amount to a minimum.

Polyvinyl aromatic crosslinking monomers include divinylbenzene and trivinylbenzene with divinylbenzene being most preferred. Commercial divinylbenzene typically consists of from 55 to 80 weight percent divinylbenzene in admixture with from 20 to 45 weight percent ethylvinylbenzene. The actual polyvinyl aromatic crosslinking monomer comprises of from 20 to 35 weight percent of the total monomer mixture. In any given instance, the ratio of the monovinyl aromatic and aliphatic monomer to the polyvinyl aromatic crosslinking monomer is from 1.8 to 4.0.

The crosslinked copolymers which form the basis of the present invention are porogen-modified, i.e., they are prepared by suspension polymerization in the presence of a porogenic solvent or a mixture of two or more such porogenic solvents. Porogenic solvents are those solvents which are suitable for forming pores and/or displacing the polymer chains during polymerization. The characteristics and use of such solvents in the formation of macroreticular or macroporous resins are described in U.S. Pat. No. 4,224,415. A porogenic solvent is one which dissolves the monomer mixture being copolymerized but which does not dissolve the copolymer. In addition, the porogenic solvents must be inert to the polymerization conditions, i.e., neither interfere with or enter into the polymerization. For the crosslinked copolymers prepared from the monovinyl aromatic monomers and the polyvinyl aromatic crosslinking monomers of the present invention, aromatic hydrocarbons like toluene, xylene and ethylbenzene, $C_6$–$C_{12}$ saturated aliphatic hydrocarbons like heptane and iso-octane and $C_4$–$C_{10}$ alkanols like tert-amyl alcohol, sec-butanol and 2-ethylhexanol are particularly effective. Aromatic hydrocarbons and $C_6$–$C_{12}$ saturated aliphatic hydrocarbons and their mixtures are preferred; toluene alone or in mixtures with a $C_6$–$C_8$ saturated aliphatic hydrocarbon is most preferred. A sufficient concentration of porogenic solvent is required to effect phase separation or polymer chain displacement. Typically, the porogenic solvent comprises of from 50 to 70 weight percent and preferably from 55 to 65 weight percent of the total weight of the monomer mixture and the porogenic solvent.

The term suspension polymerization is a term well known to those skilled in the art and comprises suspending droplets of the monomer or monomer mixture and of the porogenic solvent in a medium in which neither are soluble. This may be accomplished by adding the monomer or monomer mixture and the porogenic solvent with any additives to the suspending medium which contains a dispersing or suspending agent. For the ethylenically unsaturated aromatic monomers of the present invention, the suspending medium is usually water and the suspending agent a suspension stabilizer, e.g., gelatin, polyvinyl alcohol or a cellulosic such as hydroxyethyl cellulose, methyl cellulose or carboxymethyl methyl cellulose. When the medium is agitated, the organic phase (monomer and progenic solvent) disperses into fine droplets. Polymerization is accomplished by heating in the presence of a free-radical initiator.

The free-radical initiator may be any one or a combination of conventional initiators for generating free radicals in the polymerization of ethylenically unsaturated monomers. Representative initiators are UV radiation and chemical initiators, such as azo-compounds like azobisisobutyronitrile; and peroxygen compounds such as benzoyl peroxide, t-butylperoctoate, t-butylperbenzoate and iso-propylpercarbonate. Only a catalytic amount of initiator is required. The usual range is from about 0.01 to about 3 percent of initiator with reference to the weight of the monomer mixture. The preferred range is from 0.1 to 1.5 percent. The optimum amount of initiator is determined in large part by the nature of the particular monomers selected, the nature of the impurities present and the volume of porogen used. For example, when higher levels of polyvinyl aromatic crosslinking monomer is employed, it may be necessary to use a greater percentage of free-radical initiator, e.g. greater than 0.5 weight percent.

In a typical suspension polymerization, the organic phase containing monomer, porogenic solvent and initiator is suspended within an agitated aqueous medium. Generally, the suspending medium is employed in an amount of from 30 to 70 weight percent, preferably from 35 to 50 weight percent based on the total weight of organic phase and suspending medium. The polymerization is conducted at a temperature from between 30° and 130° C. preferably from between 70° and 110° C.

Alternatively, the copolymer beads can be prepared by a seeded, continuous-addition process as described, for example, in U.S. Pat. Nos. 4,419,245, 4,564,644 and 5,231,115 which are incorporated herein by reference. In such a process, seed particles of crosslinked copolymer are suspended in an aqueous phase and swelled with an organic phase as described above, i.e., monomer mixture, porogenic solvent and initiator. After 40 to 95 percent polymerization, a second organic phase is continuously added while polymerization continues. The second organic phase can be the same as the first or different provided that the ratios of monovinyl aromatic monomer, polyvinyl aromatic crosslinking monomer and porogenic solvent are within the limitations of the present invention. Preferably, the second organic phase is devoid of initiator.

The crosslinked copolymer beads obtained by the above-described suspension polymerization methods are essentially spheroidal in shape and have diameters which can vary widely. For most uses, bead diameters may be from 5 to 5000 microns (μm); but for chromatographic applications, bead diameters of 10 to 1000 μm are preferred. Particularly valuable for chromatographic applications are beads of uniform particle size, such as those prepared as described in U.S. Pat. Nos. 4,444,961 and 4,666,673.

The adsorbent resins of the present invention can be prepared from these crosslinked copolymer beads by additional post-crosslinking of individual polymer chains after polymerization. Post-crosslinking may be achieved by swelling the copolymer with a swelling agent and subsequently reacting the copolymer with a polyfunctional alkylating or acylating agent, as is described in U.S. Pat. Nos. 4,191,813 and 4,263,407.

A preferred method for post-crosslinking the copolymer comprises haloalkylating the copolymer with a haloalkylating agent, swelling the resulting haloalkylated copolymer with an inert swelling agent, and thereafter maintaining the swollen, haloalkylated copolymer at a temperature and in the presence of a Friedel-Crafts catalyst such that haloalkyl moieties on the copolymer react with an aromatic ring of an adjacent copolymer chain to form a bridging moiety. Friedel-Crafts catalysts are Lewis acids and include, for example, $AlCl_3$, $FeCl_3$, $BF_3$ and HF. $AlCl_3$ and $FeCl_3$ are preferred. It is also preferred to substantially remove excess haloalkylating agent and/or solvents employed in haloalkylating the copolymer prior to post-crosslinking. This type of method is described, for example, in U.S. Pat. No. 4,950,332 which is incorporated herein by reference.

In general, haloalkylation is achieved by contacting the copolymer with a haloalkylating agent under conditions sufficient to substitute the copolymer with haloalkyl moieties. Preferred haloalkylating agents are chloromethyl methyl ether and α,α'-dichloroxylene, with chloromethyl methyl ether being most preferred. Preferably, the copolymer is haloalkylated by first swelling it under non-reactive conditions with the haloalkylating agent and an effective amount of a Friedel-Crafts catalyst. The haloalkylating agent advantageously has the Friedel-Crafts catalyst incorporated therein. The swollen copolymer beads are then maintained at a temperature sufficient to react the haloalkylating agent with the copolymer beads until achieving a desired degree of reaction, usually from 0.6 to 0.7 haloalkyl groups per aromatic ring. In preparing the adsorbents of the present invention, the copolymer is preferably halomethylated and most preferably chloromethylated. Methods for haloakylating copolymer particles are known. Illustrative of such are U.S. Pat. Nos. 2,642,417; 2,960,480; and 2,992,544. Chloromethyl methyl ether is commonly employed as a haloalkylating agent. After haloalkylation, it is preferred to remove excess haloalkylating agent and/or solvents used during haloalkylation. This can be accomplished by any method, such as washing with an organic solvent like methanol, or drying.

After haloalkylation, the copolymer is contacted with a swelling agent to expand the copolymer structure. Suitable swelling agents are solvents which are substantially inert during post-crosslinking of the haloalkylated copolymer and include chlorinated hydrocarbons, such as dichloroethane, chlorobenzene, dichlorobenzene, methylene chloride, and propylene dichloride, or nitrogen-substituted aromatics, like nitrobenzene. The preferred swelling agent is dichloroethane. Preferably, the copolymer is contacted with an excess of swelling agent for a time sufficient to substantially attain equilibrium with respect to swelling of the particular swelling agent employed. It is also generally convenient to dissolve the Friedel-Crafts catalyst employed in the subsequent post-crosslinking reaction within the swelling agent.

Once swollen, the haloalklated copolymer is maintained at a temperature and in the presence of a Friedel-Crafts catalyst such that the bridging moieties are formed by reaction of the haloalkyl moieties with an adjacent aromatic ring. The reaction temperature can be from 20° to 180° C. More preferably, the temperature is from 60° to 85° C. Where the copolymer is chloromethylated, reaction of a chloromethyl group with the aromatic ring of an adjacent copolymer chain results in formation of a methylene bridge, i.e., a —$CH_2$—moiety, between two copolymer chains. After formation of the bridging moiety, the swelling agent is removed by conventional methods, such as solvent extraction, washing, drying, or a combination thereof. If a drying step is used, it is preferred to avoid an oxygen-containing atmosphere at temperatures above normal room temperature.

The adsorbents of the present invention are useful for the separation of organic compounds having molecular weights of up to 1500, particularly those of from about 200 to about 1000 which can conveniently gain access to the micropores of comparable molecular dimensions. Particularly valuable applications are related to the separations of fine chemicals and pharmaceuticals. Other applications include sugar decolorization, removal of bitter components from orange and grapefruit juice pulp, water treatment and purification, odor and flavor recovery, honey decolorization and other similar applications. Because of the more optimal pore distribution in the adsorbents of the present invention, they demonstrate superior adsorption capacity or superior diffusion rates when compared with commercially available adsorbents, i.e., either porogen modified styrene/divinylbenzene adsorbents or methylene-bridged styrene/divinylbenzene adsorbents alone. The adsorbents of the present invention are particularly well suited for chromatographic separations.

The following examples serve to illustrate the invention. Surface area, pore size and porosity were determined on a Quantachrome Model Autosorb-1 nitrogen adsorption analyzer by measuring the volume of gaseous nitrogen adsorbed by a sample at a given nitrogen partial pressure and by conducting the appropriate calculations according to the B.E.T. model.

EXAMPLE 1

PREPARATION OF COPOLYMER BEADS

A monomer mixture consisting of styrene (201.5 grams (g)), divinylbenzene (DVB, 241.8 g, 55 weight percent active, 30 weight percent based on monomer charge), toluene (856 g, 65.9 weight percent based on total organic load), t-butylperoctoate (5.32 g, 50 weight percent active) and t-butylperbenzoate (1.51 g) was added to an aqueous solution (1300 g), containing 0.2 weight percent carboxymethyl methyl cellulose and an aqueous phase polymerization inhibitor in an automated 3,785 liters (L) stainless steel reactor. The reactor was sealed, purged with nitrogen and the agitation started to size the monomer. After 45 minutes (min) of sizing, the temperature was raised to 80° C. for 7 hours (hr) and then raised to 110° C. for 5 hr. After cooling to room temperature, the reactor mass was dumped and washed thoroughly to remove the suspending agents. The wet copolymer beads were steam stripped to remove the toluene and then air dried overnight.

CHLOROMETHYLATION OF COPOLYMER BEADS

The dried copolymer (50 g) was transferred into a 1-L jacketed glass reactor equipped with a stirrer, temperature controller and a condensor. Monochloromethyl methyl ether (500 milliliters (ml)) was added and the agitation started. After about 30 min of swelling at room temperature, anhydrous ferric chloride (15 g) was added and reaction temperature slowly ramped to 52° C. and held constant for 3 hr. The chloromethylated beads (CMPS) after separation from the liquor, were washed 3 times with methanol to destroy the unreacted ether and to remove the entrained catalyst.

METHYLENE BRIDGING OF CMPS BEADS

The methanol wet CMPS from above were washed 3 times with ethylene dichloride to remove most of the methanol and then transferred into a 1-L jacketed glass reactor equipped with a stirrer, temperature controller and distillation column. The reactor was then heated to 83° C. to distill any remaining methanol. After cooling, a reflux condenser was added to the reactor and ferric chloride (15 g) was added. The reactor temperature was slowly ramped to 80° C. and held constant for 3 hr. The methylene-bridged CMPS (MCMPS) after separation from the liquor, were washed 3 times with methanol to remove the catalyst and ethylene dichloride followed by deionized water until free of acid.

The sample exhibited the following characteristics:

| | |
|---|---|
| microporosity | 0.322 cc/g |
| mesoporosity | 1.073 cc/g |
| macroporosity | 0.716 cc/g |
| total porosity | 2.111 cc/g |
| BET surface area | 1187 m$^2$/g |

EXAMPLES 2–18

The procedure of Example 1 was repeated except that the amount of divinylbenzene and the amount and composition of the porogen (toluene/iso-octane) was modified as indicated in Table I.

TABLE I

Adsorbent Characteristics

| Ex. | wt % * DVB | wt % ** TBPO | wt % Toluene (based on Total organics) | wt % iso-Octane (based on Total organics) | Micro-porosity cc/g | Meso-porosity cc/g | Macro-porosity cc/g | Total porosity cc/g | BET surface area m²/g |
|---|---|---|---|---|---|---|---|---|---|
| 2  | 25 | 0.15 | 32.3 | 24.8 | 0.340 | 0.806 | 0.703 | 1.849 | 1024 |
| 3  | 20 | 0.15 | 34.4 | 26.4 | 0.268 | 1.282 | 0.330 | 1.880 | 1160 |
| 4  | 23 | 1.1  | 34.5 | 26.4 | 0.281 | 0.507 | 1.667 | 2.455 | 924  |
| 5  | 20 | 0.15 | 44.1 | 17.8 | 0.360 | 0.654 | 0.911 | 1.925 | 1110 |
| 6  | 32 | 1.00 | 52.7 | 14.1 | 0.278 | 0.711 | 1.580 | 2.569 | 1056 |
| 7  | 20 | 1.00 | 41.8 | 22.4 | 0.298 | 0.614 | 1.113 | 2.025 | 991  |
| 8  | 25 | 0.15 | 42.1 | 18.2 | 0.296 | 0.523 | 1.042 | 1.861 | 947  |
| 9  | 25 | 0.15 | 40.8 | 17.6 | 0.331 | 0.524 | 1.034 | 1.889 | 976  |
| 10 | 34 | 1.10 | 67.5 | 0    | 0.333 | 0.913 | 0.757 | 2.003 | 1018 |

*weight % divinylbenzene (DVB) based on total weight of monomer
**Initiator consisted of 0.34 wt % t-butyl perbenzoate plus the indicated wt % of t-butyl peroctoate (TBPO); weight percent of initiators based on total weight of monomer

TABLE II

TRYPTOPHAN AND CEPHALOSPORIN C
DIFFUSION COEFFICIENTS AND ADSORPTION CAPACITIES

| Adsorbent (Example) | TRYPTOPHAN DIFFUSION COEF. (cm²/sec) 10⁻⁶ | TRYPTOPHAN CAPACITY (moles/liter) | CEPHALOSPORIN C DIFFUSION COEF. (cm²/sec) 10⁻⁶ | CEPHALOSPORIN C CAPACITY (moles/liter) |
|---|---|---|---|---|
| 1  | 6.67 | 0.155 | 4.0  | 0.171 |
| 5  | 3.33 | 0.158 | 2.0  | 0.161 |
| 9  | 2.83 | 0.133 | 2.08 | 0.156 |
| 10 | 4.50 | 0.115 | 4.5  | 0.146 |

EXAMPLE A

A HPLC chromatography system consisting of a Waters Chromatography UV detector, pump and injector was used to generate breakthrough curves for evaluating the loading capacities and kinetics of the adsorbents. The adsorption characteristics of the adsorbents were evaluated using 2000 parts per million (ppm) tryptophan and 2000 ppm cephalosporin C solutions. The 0.6 centimeter (cm) I.D.×6.5 cm long glass column were packed with 2.2 ml of adsorbent. The flow rate for both loading and regeneration ranged from 0,362 to 0,375 ml/min for the duration of the evaluation period. The columns were preconditioned at the start of each run by pumping 50 volume percent propanol/water for 30 min followed by 30 min DI water. The tryptophan was loaded for 210 min and the cephalosporin C for 450 min. The adsorption capacity was determined from the breakthrough curves. Diffusion coefficients were determined from the breakthrough curves by fitting a rate equation model to the breakthrough curves; see, for example, J. A. Berninger, R. D. Whitley, X. Zhang, and N.-Ho L. Wang, Versatile Model for Simulation of Reaction and Non-equilibrium Dynamics in Multicomponent Fixed-bed Adsorption Processes, "Comput. Chem. Eng 1991, 15, 749. Performance data, adsorption capacities and diffusion coefficients are given in Table II.

What is claimed is:

1. An improved method for the separation of organic adsorbates having molecular weights in the range of from about 200 to about 1000, wherein the improvement comprises contacting a mixture of adsorbates with a polymeric adsorbent having microporosity of from about 0.2 to about 0.4 cc/g, mesoporosity of at least 0.5 cc/g and a total porosity of at least 1.5 cc/g, and in which the microporosity comprises less than 20 percent of the total porosity comprised of a porogen-modified, crosslinked copolymer of from 45 to 80 weight percent of at least one monovinyl aromatic monomer, from 0 to 20 weight percent of a monovinyl aliphatic monomer and from 20 to 35 weight percent of a polyvinyl aromatic crosslinking monomer, the copolymer being further crosslinked by alkylene bridging.

2. The method of claim 1 in which the monovinyl aromatic monomer is styrene, ethylvinylbenzene or mixtures thereof.

3. The method of claim 1 in which the monovinyl aliphatic monomer is absent.

4. The method of claim 1 in which the polyvinyl aromatic crosslinking monomer is divinylbenzene.

5. The method of claim 1 in which the alkylene bridging is methylene bridging.

6. The method of claim 1 in which the monovinyl aliphatic monomer is absent, the monovinyl aromatic monomer is styrene, ethylvinylbenzene or mixtures thereof, the polyvinyl aromatic crosslinking monomer is divinylbenzene and the alkylene bridging is methylene bridging.

* * * * *